(12) United States Patent
Culpi

(10) Patent No.: US 9,312,790 B2
(45) Date of Patent: Apr. 12, 2016

(54) COMPACT VERSATILE STICK-SLIP PIEZOELECTRIC MOTOR

(71) Applicant: Physik Instrumente (PI) GmbH & Co. KG, Karlsruhe (DE)

(72) Inventor: William Culpi, Lake Forest, CA (US)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 336 days.

(21) Appl. No.: 14/026,666

(22) Filed: Sep. 13, 2013

(65) Prior Publication Data

US 2015/0076965 A1 Mar. 19, 2015

(51) Int. Cl.
| | |
|---|---|
| *H01L 41/09* | (2006.01) |
| *H02N 2/00* | (2006.01) |
| *G05B 19/40* | (2006.01) |
| *H02N 2/10* | (2006.01) |
| *H02N 2/02* | (2006.01) |

(52) U.S. Cl.
CPC ............... *H02N 2/006* (2013.01); *G05B 19/40* (2013.01); *H02N 2/025* (2013.01); *H02N 2/101* (2013.01); *G05B 2219/41344* (2013.01)

(58) Field of Classification Search
USPC .................................................. 310/311–371
See application file for complete search history.

(56) References Cited

U.S. PATENT DOCUMENTS

| | | | |
|---|---|---|---|
| 3,320,580 A | 5/1967 | Sykes | |
| 3,902,085 A | 8/1975 | Bizzigotti | |
| 4,019,073 A | 4/1977 | Vishnevsky et al. | |
| 4,453,103 A | 6/1984 | Vishnevsky et al. | |
| 4,525,852 A | 6/1985 | Rosenberg | |
| 4,594,584 A | 6/1986 | Pfeiffer et al. | |
| 4,607,166 A | 8/1986 | Tamaki | |
| 4,613,782 A | 9/1986 | Mori et al. | |
| 4,622,483 A | 11/1986 | Staufenberg, Jr. et al. | |
| 4,647,808 A | 3/1987 | Shibuya | |
| 4,714,855 A | 12/1987 | Fujimoto | |
| 4,727,278 A | 2/1988 | Staufenberg, Jr. et al. | |
| 4,775,815 A | 10/1988 | Heinz | |
| 4,805,543 A * | 2/1989 | Schwab | B23Q 1/36 108/20 |
| 4,831,306 A | 5/1989 | Staufenberg, Jr et al. | |
| 4,857,793 A | 8/1989 | Okuno | |
| 4,918,351 A | 4/1990 | Kawai | |
| 4,933,590 A | 6/1990 | Inoue et al. | |
| 4,975,615 A | 12/1990 | Katahara | |

(Continued)

FOREIGN PATENT DOCUMENTS

| | | |
|---|---|---|
| WO | 2008087469 | 7/2008 |
| WO | 2012009379 | 1/2012 |

*Primary Examiner* — Thomas Dougherty
(74) *Attorney, Agent, or Firm* — Michael Best & Friedrich LLP

(57) ABSTRACT

A motion control system that includes a base, a stage supported by the base and movable with respect to the base, and a motor coupled to the base and operable to move the stage. The motor includes a mounting base arranged to connect the motor to the base, a friction pad engageable with the stage, and a coupling portion including a first end connected to the mounting base and a second end. The friction pad is connected to the coupling portion between the first end and the second end. A piezoelectric element is disposed between the mounting base and the second end and is operable in response to an electrical signal to move the friction pad and the stage. A mounting screw is accessible from an exterior of the base and engages the coupling portion. The mounting screw is the sole attachment mechanism between the motor and the base.

10 Claims, 6 Drawing Sheets

(56) References Cited

U.S. PATENT DOCUMENTS

| | | |
|---|---|---|
| 5,017,820 A | 5/1991 | Culp |
| 5,027,028 A | 6/1991 | Skipper |
| 5,034,647 A | 7/1991 | Ohtsuka |
| 5,059,850 A | 10/1991 | Yoshimura et al. |
| 5,079,471 A | 1/1992 | Nygren, Jr. |
| 5,140,470 A | 8/1992 | Luecke |
| 5,247,220 A * | 9/1993 | Miyazawa ............. H02N 2/163 310/316.02 |
| 5,394,049 A | 2/1995 | Luecke |
| 5,410,206 A | 4/1995 | Luecke et al. |
| 5,543,670 A * | 8/1996 | Luecke ................... H01L 41/12 310/26 |
| 6,232,700 B1 | 5/2001 | Kosaka et al. |
| 6,565,762 B1 * | 5/2003 | Silverbrook ......... B41J 2/14314 216/27 |
| 7,119,478 B1 | 10/2006 | Mentesana |
| 2003/0059194 A1 | 3/2003 | Trzecieski |
| 2004/0124744 A1 | 7/2004 | Pease et al. |
| 2004/0124747 A1 | 7/2004 | Bugel et al. |
| 2006/0169837 A1 | 8/2006 | Bird et al. |
| 2009/0127974 A1 | 5/2009 | Piotr et al. |
| 2009/0140607 A1 * | 6/2009 | Wakayama ............ H02N 2/025 310/323.13 |
| 2010/0118421 A1 | 5/2010 | Woodard et al. |
| 2010/0245518 A1 * | 9/2010 | Matsumoto ........... H02N 2/103 347/104 |
| 2010/0290138 A1 | 11/2010 | Thomas et al. |
| 2012/0013999 A1 | 1/2012 | Thomas et al. |

* cited by examiner

COMPACT VERSATILE STICK-SLIP PIEZOELECTRIC MOTOR

BACKGROUND

Piezoelectric elements are used as driving components in positioning mechanical devices. These "piezoelectric motors" (sometimes called "piezoelectric actuators") have some unique advantages over other types of traditional motors which make them a preferred choice for use in specific applications. The typical use of a piezoelectric element as a motion device is by using its characteristic of expanding in one direction when placed in an electric field. By stacking multiple thin piezoelectric elements between a series of electrical electrodes it is possible to increase the relative expansion of a piezoelectric actuator but the motion still remains extremely small relative to the overall size of the device. For applications that require moves with travel ranges less than a few hundred microns and resolution in the nanometer range, the piezoelectric actuators are the usual favorite. These implementations may or may not use a mechanical amplifier (typically using the "lever arm" principle) and are directly coupled to the load. Piezoelectric-based motion devices using this type of driving mechanism typically use flexure-based mechanisms and are capable of fast speeds and resolutions less than a nanometer.

To achieve a longer travel range, one type of piezoelectric motor that has been developed is a friction-based configuration where one or more friction "legs" are in contact with a friction "track". By applying a constant high pressure between the legs and the track, the friction legs can "stick" to the friction track. A piezoelectric element is attached to either the friction "legs" or "track". When a slow varying voltage is applied to the piezoelectric element, the respective friction element will move. Due to the high friction forces, the two friction elements will "stick" and move together. If the electrical signal driving the piezoelectric elements changes very rapidly, the friction elements will "slip" relative to each other due to the inertia of the masses associated with the components involved. While the actual motion happens during the slow movement phase of the piezoelectric element, the slippage changes the relative position between the friction legs and the friction track effectively allowing the piezoelectric element to add a new displacement to the previous one. Large travel distances can be achieved by repeating this cycle many times and effectively "stitching" together the small piezoelectric moves. The travel length of this type of piezoelectric motor is typically limited by only the length of the friction track. The track could be linear or circular, allowing the motor to generate a linear or rotary motion. These types of motors are typically called piezoelectric "stick-slip" motors.

The most popular current implementations of stick-slip motors can be grouped in two categories, based on the configuration of the friction legs relative to the friction track. The first type arranges the friction legs around the friction track, effectively forming a clamp on a track shaped as a rod. These motors have the advantage of a concentric configuration, allowing high preload forces to be applied without stressing the motion devices to which they are mounted. The main disadvantages are that the preload force cannot be adjusted and the travel could be limited by the length of the rod. The piezoelectric element can be attached to either the clamp or the rod, with advantages and disadvantages to each configuration.

In the second type of stick-slip motor, the piezoelectric element is typically attached to one or more friction legs which are in contact with the friction track only on one side. This allows the active part of the motor (piezoelectric element and friction leg) to be built as a separate unit that could be tangentially attached to any track, linear or rotary. These types of motors are more versatile but have the disadvantage of generating lower forces and adding stresses to the bearings of the motion devices to which they are attached.

SUMMARY

The present invention makes a number of significant enhancements to existing designs. The proposed stick-slip motor configuration improves on the manufacturability, usability, simplicity, cost and performance while significantly reducing the size of the motor for the same force generated.

In one construction, the invention provides a motion control system that includes a base, a stage supported by the base and movable with respect to the base, and a motor coupled to the base and operable to move the stage. The motor includes a mounting base arranged to connect the motor to the base, a friction pad engageable with the stage, and a coupling portion including a first end connected to the mounting base and a second end. The friction pad is connected to the coupling portion between the first end and the second end. A piezoelectric element is disposed between the mounting base and the second end and is operable in response to an electrical signal to move the friction pad and the stage. A mounting screw is accessible from an exterior of the base and engages the coupling portion. The mounting screw is the sole attachment mechanism between the motor and the base.

In another construction, the invention provides a motion control system that includes a base, a stage supported by the base and movable with respect to the base, and a motor coupled to the base and operable to move the stage. The motor includes a mounting base arranged to connect the motor to the base, a friction pad engageable with the stage, and a coupling portion including a first end connected to the mounting base and a second end. The friction pad is connected to the coupling portion between the first end and the second end. The motor also includes a piezoelectric element disposed between the mounting base and the second end and operable in response to an electrical signal to move the friction pad and the stage. A preload member includes a motor end and an adjustment end. The motor end is in contact with the motor and is movable to apply a variable preload force to the motor. The adjustment end is positioned to be accessible from an exterior of the base and substantially flush with the base.

In yet another construction, the invention provides a motion control system that includes a base including a first pocket, a stage positioned within the first pocket and movable with respect to the base, and a motor coupled to the base and operable to move the stage. The motor includes a mounting base arranged to connect the motor to the base, a friction pad engageable with the stage, and a coupling portion including a first end connected to the mounting base and a second end. The friction pad is connected to the coupling portion between the first end and the second end. The motor also includes a piezoelectric element disposed between the mounting base and the second end and operable in response to an electrical signal to move the friction pad and the stage. The motor defines a motor perimeter, and at least 90 percent of the space within the perimeter is filled by the motor and the piezoelectric element.

In still another construction, the invention provides a piezoelectric motor for use in a motion control system. The piezoelectric motor is supported in a base and is operable to move a stage. The piezoelectric motor includes a mounting base arranged to connect the piezoelectric motor to the base, a friction pad engageable with the stage, and a piezoelectric element coupled to the mounting base and operable in response to an electrical signal to move the friction pad. A coupling portion includes a first end connected to the mounting base and a second end coupled to the piezoelectric element. The friction pad is connected to the coupling portion between the first end and the second end. The coupling portion includes a tapered spring having a first end having a first width, a second end having a second width, and a turn portion having a turn width, wherein the first width and the second width are smaller than the turn width.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
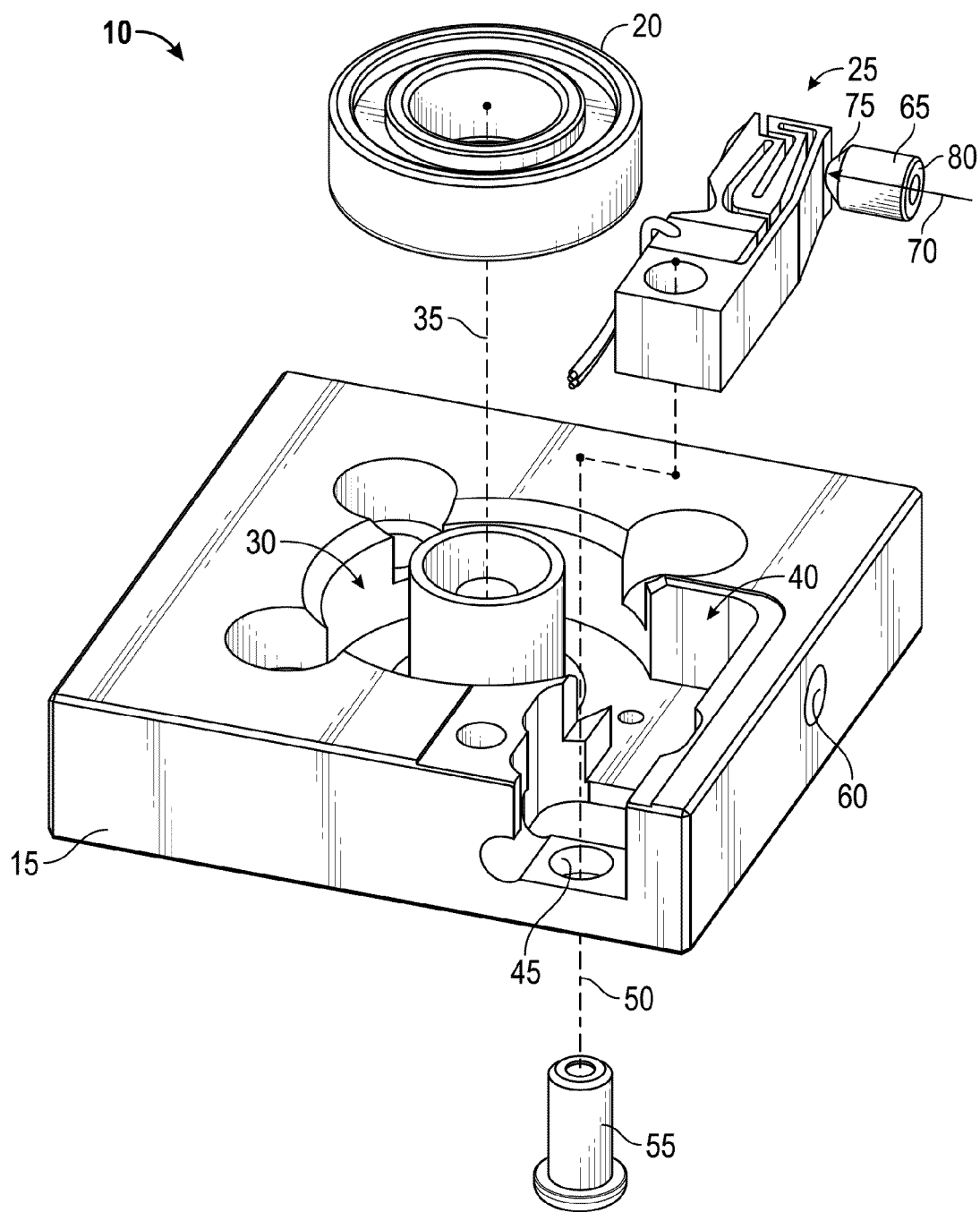
FIG. 1 is a perspective exploded view of a motion control system embodying the invention.

FIG. 1 illustrates an exploded view of a portion of a motion control system 10 that includes a base 15, a stage 20, and a motor 25 in the form of a piezoelectric motor. The base 15 can take virtually any form but generally includes a stationary component that supports the stage 20 for movement and supports the motor 25 to engage the stage 20 to produce the desired movement. In the illustrated construction, the base 15 includes a stage pocket 30 sized to receive the stage 20 and support the stage 20 for rotation about an axis of rotation 35.

The stage 20 may include bearings or other components that facilitate the smooth movement of the stage 20. In other constructions, a linear stage might be supported within an elongated slot for linear movement along an axis parallel to the slot.

A motor pocket 40 is also formed in the base 15 and is sized and shaped to receive the motor 25. A first aperture 45 extends through the base 15 into the motor pocket 40 along an axis 50 that is substantially parallel to the axis of rotation 35 of the stage 20 and is sized to receive a mounting screw 55. The mounting screw 55 engages the motor 25 to fixedly attach the motor 25 to the base 15. A second aperture 60 extends into the motor pocket 40 and is disposed normal to the first aperture 45 and is generally radial with regard to the rotary stage 20. A preload member 65 threadably engages the second aperture 60 and is movable into and out of the aperture 60 to accurately set a desired preload force 70 for application to the motor 25. In preferred constructions, a preload force 70 between about zero and 40 newtons is applied to the motor 25.

With continued reference to FIG. 1, the mounting screw 55 passes through the first aperture 45 and threadably engages the motor 25. As can be seen, the mounting screw 55 is fully accessible from outside of the base 15 to allow the user to tighten or loosen the screw 55, thereby controlling the engagement of the motor 25 and the stage 20 without disassembly of the motion control system 10 in any way.

Figure 2:
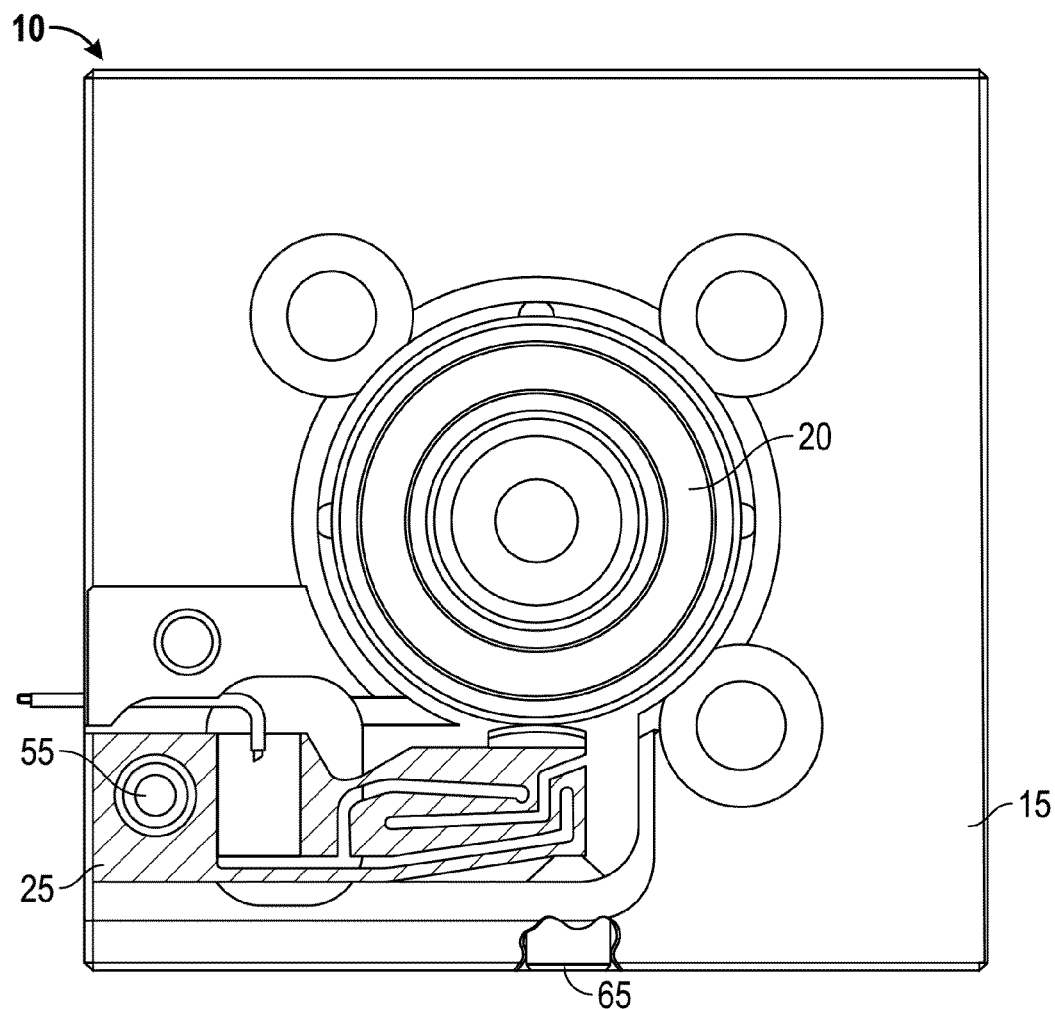
FIG. 2 is a top view of the motion control system of FIG. 1.

With reference to FIG. 2, the motor 25 and the stage 20 are illustrated in their respective operating positions within the motor pocket 40 and the stage pocket 30. As illustrated, the preload screw 65 includes a first end 75 that engages the motor 25 and a second end 80 that is exposed at an exterior surface of the base 15. The second end 80 remains substantially flush with the base 15 and preferably recessed within the base 15 when the desired preload is applied. This arrangement of the preload screw 65 allows for periodic adjustment of the preload force 70 from outside of the base 15 without disassembly of the motion control system 10 and without significantly increasing the footprint of the motion control system 10.

Figure 3:
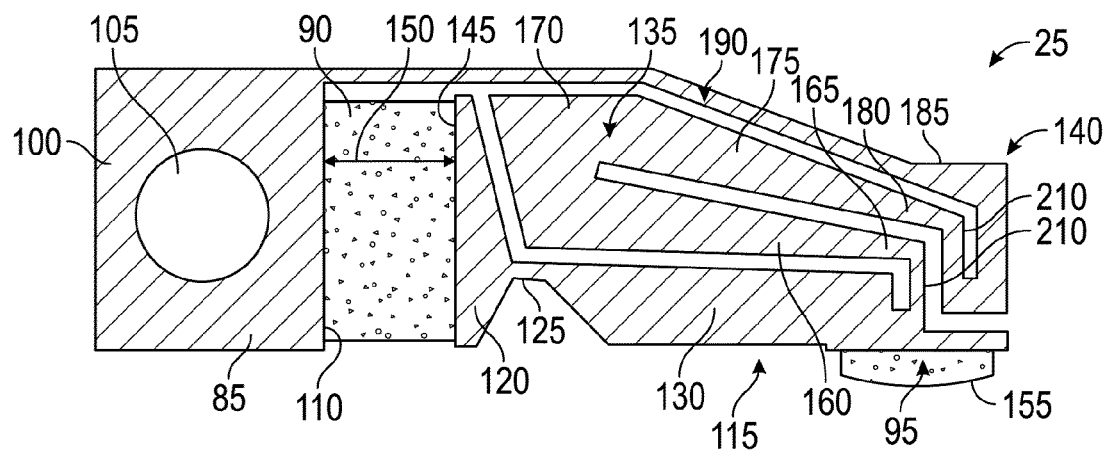
FIG. 3 is a top view of a stick-slip piezoelectric motor suitable for use in the motion control system of FIG. 1.

FIGS. 3-8 illustrate an embodiment of the motor 25 of FIGS. 1 and 2 in the form of a piezoelectric motor. The motor 25 includes a body 85 machined to a desired shape from a hard metal or other suitable material, a piezoelectric stack 90, and a hard ceramic pad 95, all connected to one another as shown in FIG. 3. The particular shape of the body 85 achieves maximum functionality for the volume it occupies.

The body 85 includes a mounting base 100 that has a single threaded hole 105 which is used to rigidly attach the motor 25 to the base 15 as was described with regard to FIGS. 1 and 2. The mounting base 100 is formed at one end of the body 85 and includes a substantially solid rectangular portion through which the threaded hole 105 is formed. The mounting base 100 also defines a first piezoelectric element interface surface 110 that is arranged to receive the piezoelectric stack 90 or element. The piezoelectric stack 90 is bonded to the first piezoelectric element interface surface 110 using an adhesive or other suitable attachment means.

The body 85 also includes a coupling portion 115 that includes a coupling pad 120, a thin flexure 125, a rigid coupler 130, a tapered spring 135, and a preload arm 140. The coupling pad 120 includes a second piezoelectric element interface surface 145 that is arranged to be substantially parallel to the first piezoelectric element interface surface 110. The piezoelectric stack 90 is bonded to the second piezoelectric element interface surface 145 such that a direction of expansion 150 is substantially perpendicular to the two piezoelectric element interface surfaces 110, 145.

The thin flexure 125 interconnects the ceramic pad 95 (friction pad) and the rigid coupler 130. The friction pad 95 is coupled to the rigid coupler 130 or formed as part of the rigid coupler 130 and is arranged to engage the stage 20, and more specifically the friction track 20 on the stage to provide the desired motion in response to the expansion and contraction of the piezoelectric stack 90. In preferred constructions, the friction pad 95 is bonded to the rigid coupler 130 using an adhesive with other attachment means being suitable for use. The friction pad 95 is preferably made from an ultra-hard ceramic material and has a spherical friction surface 155 with other surface arrangements being possible e.g., cylindrical, flat, elliptical, oval, etc.).

The motor arrangement of FIG. 3 ensures the desired stiffness between the piezoelectric stack 90 and the friction pad 95, thereby enhancing the efficiency of the motor 25 and the stiffness of the motion control system 10 in the direction of expansion 150. Previous motor implementations use a longer thin coupling arm which reduces the stiffness and the efficiency of the motor. In addition, some prior motors use a longer, thin and sometimes curved coupling arm in place of the described rigid coupler 130. In those configurations the coupling arm compresses or buckles during the "slip" phase of the motor creating a small spring. This reduces the efficiency of the motor by reducing the amount the motor slips during the slip phase. To compensate for this, users are forced to use higher driving voltages which generate higher power losses, higher vibrations, and higher noise.

Figure 8:
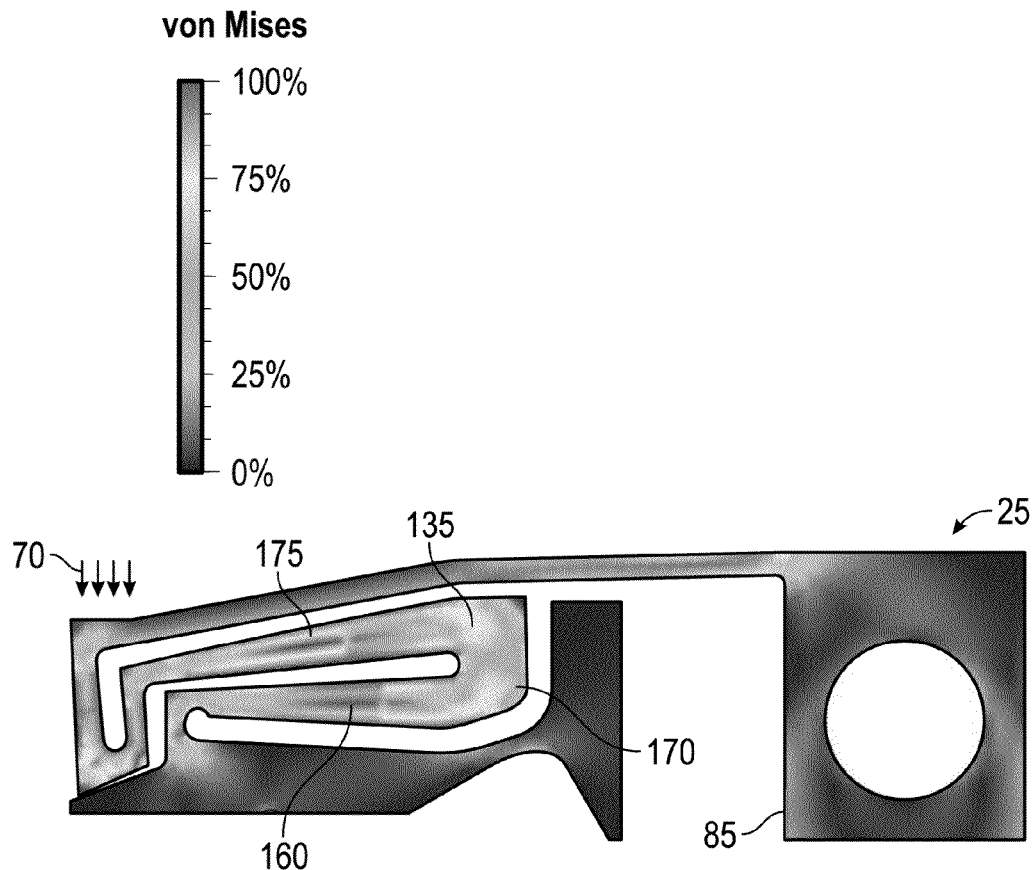
FIG. 8 is a top view of the motor of FIG. 3 illustrating the calculated stress distribution with an applied preload.

The tapered spring 135 of the piezoelectric motor 25 of FIG. 3 includes a double tapered spring 135 which utilizes the entire center of the body 85 to attain the maximum possible force and displacement in the least amount of space. The spring 135 includes a first arm 160 that extends from a first end 165 having a first thickness to a turn portion 170 having a second thickness. In the illustrated construction, the thickness of the first arm 160 increases linearly from the first thickness to the second thickness. The turn portion 170 is a U-shaped portion that connects the first arm 160 to a second arm 175. The second arm extends from the turn portion 170 having a first thickness to a second end 180 having a second thickness. The thickness of the second arm 175 decreases linearly from the first thickness to the second thickness. The cross section of the spring arms 160, 175 are arranged such that the material is substantially equally stressed throughout the entire spring length as illustrated in FIG. 8. This configuration allows for the most efficient utilization of the space occupied by the motor 25, thus enabling the construction of smaller miniature high performance motors 25 than was previously possible.

The preload arm 140 includes a preload surface 185 and a flexible element 190 that extends between the preload surface 185 and the mounting base 100. At least a portion of the flexible element 140 is angled with respect to the expansion direction 150 to define a recessed area 195. The preload surface 185 is defined in this recessed area 195 to reduce the space taken by the preload screw 65. This feature enables the design of smaller motion devices 10 by reducing the amount of material needed to support the preload screw 65.

Thus, the coupling portion 115 follows a generally circuitous path that extends from the coupling pad 120 through the thin flexure 125 and the rigid coupler 130 in a direction that is substantially parallel to the direction of expansion 150. This assures that this portion of the coupling portion 115 is rigid in the direction of expansion 150 but more flexible in other directions. The coupling portion 115 then turns about 180 degrees and follows the first arm 160 of the spring 135 to the turning portion 170. At the turning portion 170, the coupling portion 115 turns again about 180 degrees and follows the second arm 175 to the preload arm 140. The preload arm 140 then turns slightly less than 180 degrees to the flexible element 190 which extends at an acute angle with respect to the direction of expansion 150 for at least a portion of its length until it meets the mounting base 100.

The arrangement of the motor 25 of FIG. 3 is such that a very efficient use of available volume is achieved. The motor 25 of FIG. 3 defines an outer motor perimeter 200 (shown in FIG. 5) and at least 70 percent of the possible space within that motor perimeter 200 is occupied by the motor 25 and the piezoelectric element 90. In preferred constructions, at least about 75 percent (plus or minus 2 percent) of the space is used, with more preferred embodiments using about 80 percent of the space. Thus, the air spaces employed in the motor 25 make-up no more than 30 percent of the space within the motor perimeter 200.

Figure 4:
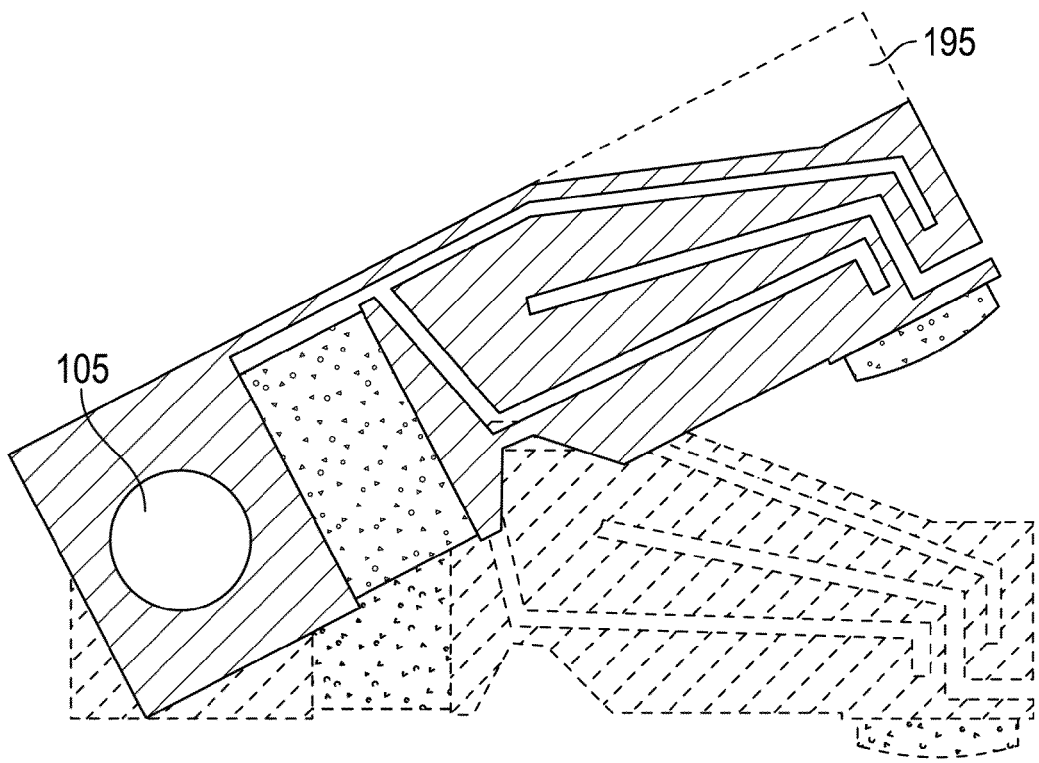
FIG. 4 is a top view of the motor of FIG. 3 illustrating the pivoting ability of the stick-slip piezoelectric motor of FIG. 3.

To assemble the motion control device 10 the entire motor 25 is attached to the base 15 through the single mounting hole 105 in the mounting base 100. This attachment is the sole connection between the base 15 and the motor 25 that retains the motor 25 within the base 15. The single connection allows the entire motor 25 to pivot around the mounting hole 105 as shown in FIG. 4. In addition, the screw 55 is preferably accessible from outside the motion control device 10 to allow the entire motor 25 to be rotated or locked down without having to open the motion control device 10 or disassemble the device 10 in anyway. This is a tremendous help in production, simplifying the assembly and calibration procedures of the motion control devices 10. It also plays an important role in extending the life of the motion control device 10 as the preload adjustment can be made by any qualified user in the field, thereby making it more likely that necessary periodic adjustments are made.

Figure 5:
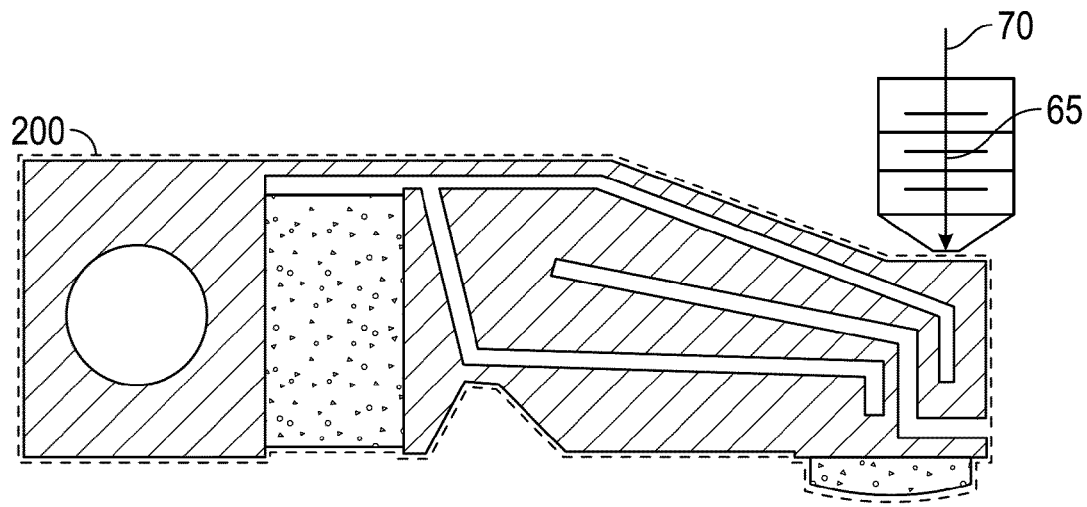
FIG. 5 illustrates the motor of FIG. 3 with a preload screw in an operating position.
Figure 6:
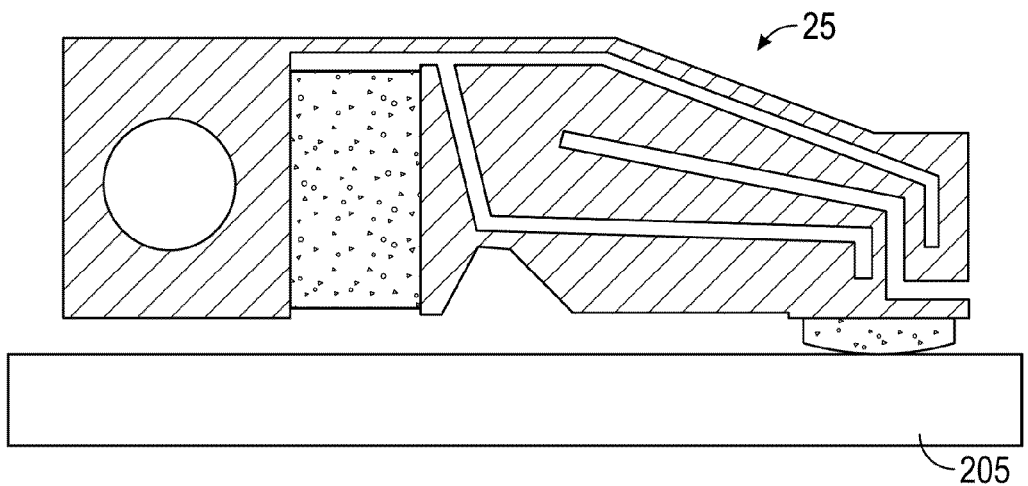
FIG. 6 illustrates the motor of FIG. 3 positioned to drive a linear track.
Figure 7:
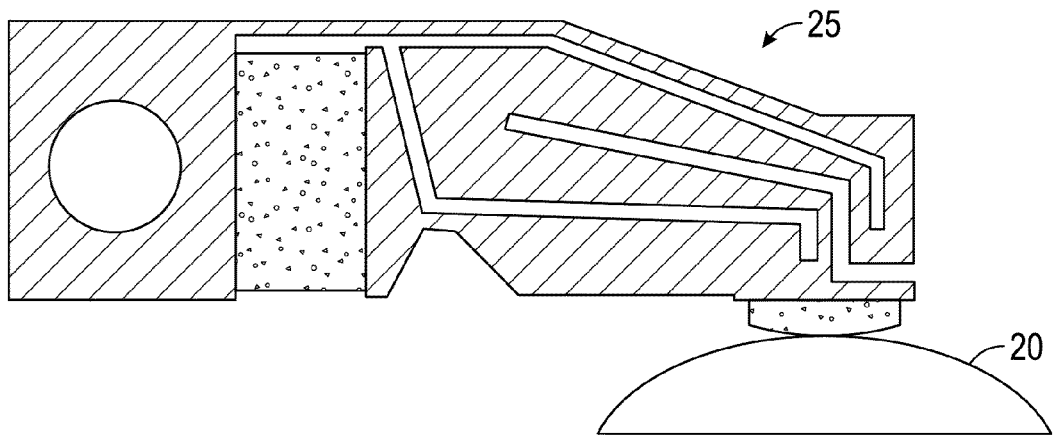
FIG. 7 illustrates the motor of FIG. 3 positioned to drive a cylindrical track.

To use the motion control device 10, the user applies the preload force 70 to the preload surface 185 using the preload screw 65 as illustrated in FIG. 5. The preload force 70, once applied produces the needed pressure between the friction pad 95 and the friction track on the stage 20. FIG. 6 illustrates the friction pad 95 engaging a linear stage 205 while FIG. 7 illustrates the friction pad 95 engaging a rotary stage 20. The force 70 on the preload surface 185 is transmitted to the friction pad 95 through the tapered spring 135. The spring 135 is connected to the preload surface 185 and the friction pad 95 through two thin flexures 210 which are stiff in the direction of the preload force 70 and flexible in the direction of the piezoelectric expansion 150. For added rigidity of the entire assembly 10, the preload surface 185 is connected to the mounting base 100 through the flexible element 190. The flexible element 190 functions to connect the preload arm 140 to the base 100. It is designed to be somewhat rigid in the direction of the piezoelectric element expansion 150 and much more flexible in the perpendicular direction.

The spherical friction surface 155 of the friction pad 95, in combination with the pivoting capability of the motor 25 around the mounting hole 105, and the use of the preload screw 65, allows for a very quick and easy assembly procedure, significantly reducing the production cost of the motion device 10. Specifically, the user places the friction pad 95 in contact with the friction track and the entire motor body is rotated around the mounting hole 105 without introducing any stress in the motor. When the preload force is applied on the surface 185, the tapered preload spring compresses while the friction pad 95 and the connecting arm 130 do not move. This insures that the preload adjustment does not introduce any undesirable forces on the piezoelectric element 90. Furthermore, it eliminates the need for high precision components as the entire motor 25 is very tolerant to misalignment and can be adjusted to almost any track surface. The motor 25 can be easily attached to a linear track (or stage) 205 (FIG. 7) to generate a linear motion or to a cylindrical track (or stage) 20 (FIG. 8) to generate a rotary motion. In addition, the preload screw 65 is exposed to the exterior of the base 15, thereby allowing for the adjustment of the preload 70 without having to open the motion control device 10 or disassemble the device 10 in anyway.

The force the stick-slip motor 25 is capable of generating in the direction of motion 150 is proportional to the friction force between the friction pad 95 and the friction track. This friction force is in turn proportional to the force with which the friction pad 95 is pushed against the friction track (i.e., the preload force 70). In the illustrated construction, the preload force 70 is determined by the amount of compression of the tapered spring 135. The tapered spring 135 is compressed by the preload screw 65 pushing on the preload surface 185. The externally accessible preload screw 65 combined with the externally accessible mounting screw 55 are a significant improvement over existing designs. They simplify the assembly and calibration procedures of the motion devices 10 thus reducing the production time and cost. They also allow qualified users to make preload adjustment in the field to compensate for eventual wear in high duty cycle applications, effectively extending the life of the motion device 10.

Figure 9:
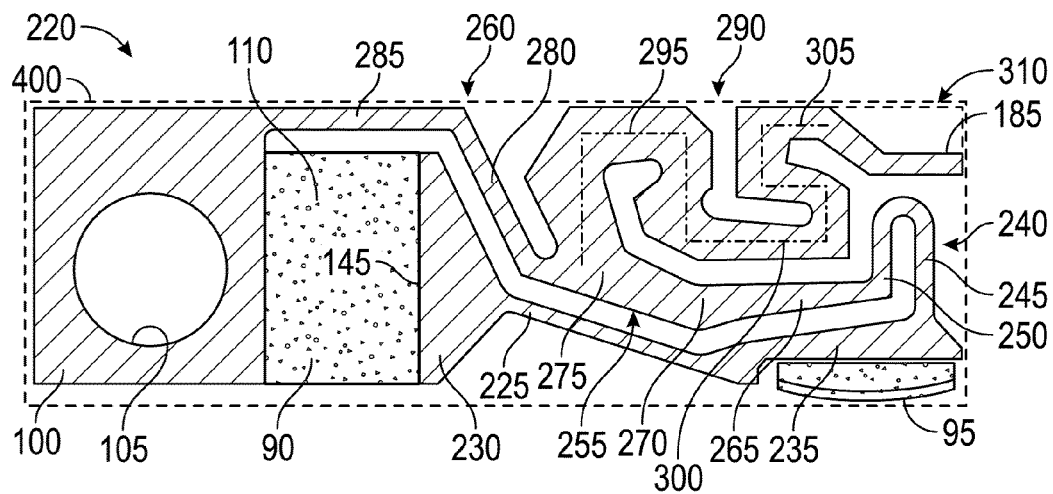
FIG. 9 is a top view of another stick-slip piezoelectric motor suitable for use in the motion control system of FIG. 1.

FIG. 9 illustrates another construction of a motor 220 that is suitable for use in the motion control system 10 of FIGS. 1 and 2. The motor 220 includes a mounting base 100, a friction pad 95, a preload surface 185, and a piezoelectric stack 90 that are substantially the same as those components of the motor 25 of FIG. 3.

The motor 220 of FIG. 9 includes a thin flexure 225 that is longer than the thin flexure 125 of the motor 25 of FIG. 3 and is arranged at an acute angle with respect to a direction of expansion 150. The thin flexure 225 extends from a coupling pad 230 to a rigid coupler 235 that supports the friction pad 95. A U-shaped member 240 includes two legs 245, 250 that extend in a direction substantially parallel to an applied preload force 70. The U-shaped member 240, including the two legs 245, 250 are substantially uniform in thickness with the first leg 245 coupled to the rigid coupler 235 and the second leg 250 extending into a tapered linkage 255. The tapered linkage 255 extends from the second leg 250 of the U-shaped member 240 to a flexible element 260 and includes a thickness that increases from the U-shaped member 240 to the flexible element 260. The tapered linkage 255 includes a first portion 265 that increases thickness at a first linear rate, a second portion 270 that increases thickness at a second linear rate, and a third portion 275 that increases thickness at a third rate. In other constructions, other thickness variations (e.g., non-linear) are possible. The flexible element 260 includes a first portion 280 that extends at an acute angle with respect to the expansion direction 150 and a second portion 285 that is substantially parallel to the expansion direction 150. The flexible element 260 is substantially uniform in thickness.

With continued reference to FIG. 9, a preload arm 290 extends from the tapered linkage 255 in a cantilever fashion and follows a circuitous path from the tapered linkage 255 to the preload surface 185. The preload arm 290 includes a first portion 295 that follows a substantially U-shaped path, a second portion 300 that follows a path that turns through approximately 270 degrees, and a third portion 305 that is substantially L-shaped. An angled portion 310 extends from the end of the L-shaped portion 305 to the preload surface 185 to define a recess space 310 for the preload screw 65.

Figure 10:
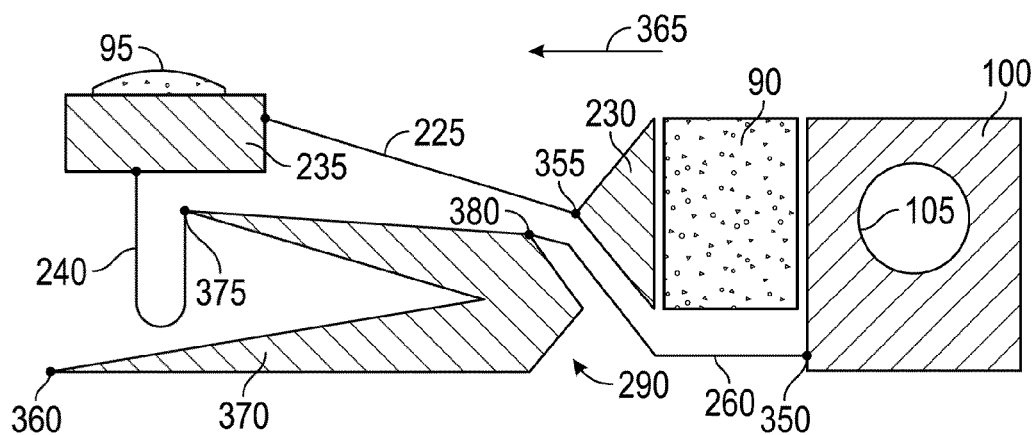
FIG. 10 is schematic or symbolic representation of the motor of FIG. 10.

As is more clearly illustrated in FIG. 10, the motor 220 of FIG. 9 has a star configuration with three distinct arms. One arm is connected to the base 100, a second arm is connected to the piezoelectric element on the surface 145 and a third arm where the preload is applied on surface 185. Flexible element 260 is flexible in both directions and functions to support the entire preload structure. The forces applied to the mounting base 100 are applied near one another and are parallel to the direction of motion. The main force is applied by the piezoelectric element which is in line with the mounting hole 105 with the flexible arm 260 applying relatively little force to the mounting base 100. The U-shaped member 240 is substantially rigid in the direction of the preload force 70 and relatively flexible in the direction of the piezoelectric element expansion 150. It therefore offers little resistance in the direction of motion and isolates the preload flexure from the piezoelectric element movement. The tapered linkage 255, together with the preload arm 290 forms a tapered U-shaped preload spring. The particular shape of the preload arm 290 provides a longer travel range of the adjustment surface 185, thereby providing for finer preload adjustment with the preload screw.

FIG. 10 is a symbolic illustration of the motor 220 of FIG. 9 and better illustrates the flexibility and rigidity of the motor. As discussed with regard to FIG. 9, the motor includes a complex structure that, in the simplified illustration has a star configuration with three distinct ends; a fixed end 350, a moving end 355 attached to the piezoelectric element or stack 90, and a floating end 360 which is used for preload adjustment.

The mounting base or rigid base 100 is mounted to a motion platform using the mounting or threaded hole 105. This provides a relatively rigid fixed point from which all motion is measured. One side of the piezoelectric element 90 attaches to the rigid base 100 such that the direction of expansion 365 is perpendicular to the mounting hole 105. The opposite side of the piezoelectric element 90 attaches to the coupling pad 230 (sometimes referred to as a rigid plate).

The thin flexure 225 connects to the coupling pad at the moving end. The opposite end of the thin flexure 225 connects to the rigid coupler 235 with the friction pad 95 connected to the rigid coupler for engagement with the moving portion of the motion device. The thin flexure 225 is illustrated as a beam that extends in a direction that is substantially parallel to the direction of expansion. Thus, the thin flexure is relatively rigid in the direction of expansion, thereby assuring that most of the expansion of the piezoelectric element is transferred to the friction pad 95. Only the coupling pad, the thin flexure, and the rigid coupler are involved in transferring motion from the piezoelectric element to the friction pad. However, the thin flexure 225 is relatively flexible in a direction perpendicular to the direction of expansion 365. Thus, during operation, inconsistencies in the surface that engages the friction pad are absorbed by displacement of the thin flexure without affecting the preload or the expansion of the piezoelectric element.

A preload force perpendicular to the direction of expansion (and motion) is applied to the friction pad in order to generate the necessary friction between the friction pad and the opposing track to assure the desired motion. This preload force is generated, in the motor of FIGS. 9 and 10 entirely by the preload arm in the shape of a U-shaped tapered spring 290 by compressing the floating end 360 of a floating spring arm 370.

The preload force generated by the U-shaped tapered spring 290 is transferred to the rigid coupler 235 and the friction pad 95 through the U-shaped member 240. The arrangement of the U-shaped member 240 is such that it is relatively stiff in the direction of the preload force and substantially normal to the direction of expansion. However, the U-shaped member is relatively flexible and offers little resistance in the direction of the expansion. This arrangement allows users to apply a high preload force in a direction normal to the direction of expansion independent of, and without affecting the forces generated by the piezoelectric element during expansion.

The flexible element 260 does not perform any significant structural function. The flexible element is flexible in directions both parallel to and perpendicular to the direction of expansion (and motion). The flexible element 260 functions to connect the U-shaped member 240 to the mounting base 100 to complete a generally U-shaped segment that includes two ends connected to the mounting base with the friction pad supported opposite the open end of U-shaped segment. The U-shaped tapered spring connects to the U-shaped segment such that one leg of the U-shaped tapered spring resides on the U-shaped segment with the floating spring arm essentially cantilevering from the U-shaped segment.

The leg of the U-shaped spring that attaches to the U-shaped segment attaches at a first joint 375 adjacent the U-shaped element and a second joint 380. The first joint and the second joint are aligned along a line that is substantially parallel to the direction of expansion. This arrangement reduces the stress levels when the entire structure has to adapt to imperfections in the track engaged by the friction pad. The arrangement also reduces the likelihood of force and therefore stress generated by the preload force being transferred to the piezoelectric element.

FIG. 10 illustrates the U-shaped tapered spring 290 as being a simple U-shape. If a simple U-shape was used, the small size of the motor would allow for the necessary preload force with little displacement of the floating end 360. However, because such a small displacement would be required, it would be difficult to adjust the desired preload and the level of the preload would be susceptible to variations caused by imperfections in the track. To reduce this sensitivity and to make setting the preload easier, the floating spring arm 370 is arranged to follow a winding path (identified in FIG. 10 as U-shaped tapered spring 290 in FIG. 9) that occupies as much of the space that is available as possible. In doing so, the adjustment range of the floating end can be the entire gap between the floating spring arm and the U-shaped element 240, thereby maximizing the preload adjustability.

It should be noted that the space occupied by the arm is limited by manufacturing techniques. In a preferred construction, wire EDM is used to cut the circuitous path that defines the various features of the motor. Wire EDM is limited in that a slot of about 0.3 mm or greater is typically made during the cutting process. However, other manufacturing methods or systems could be employed to reduce the size of these slots to further improve the motor designs.

The arrangement of FIGS. 9 and 10 provide a very compact motor for a given size piezoelectric stack. For example, the height of the motor (normal to the direction of expansion) is only 0.6 mm more than the height of the piezoelectric stack in the same direction. Thus, for a 3 mm high piezoelectric stack, the motor height is only 3.6 mm. In addition, the floating end, and therefore the preload screw, has a travel range of about 0.3 mm. This is a relatively large value for such a small motor size, and allows for an easy and accurate preload value adjustment. The preload arrangements described herein are capable of generating up to about 40 N of force with about 0.3 mm of adjustment range for a preload force between about (plus or minus 25%) 0 and 40 N.

The arrangement of the motor 220 of FIG. 9 is such that a very efficient use of available volume is achieved. The motor 220 of FIG. 9 defines an outer motor perimeter 400 that defines a total motor volume. In the illustrated construction, at least about 70 percent (plus or minus 2 percent) of the possible space within that total motor volume is occupied by the motor 220 and the piezoelectric element 90. In preferred constructions, at least about 75 percent (plus or minus 2 percent) of the space is used, with more preferred embodiments using about 80 percent of the space. Thus, the air spaces employed in the motor 220 make-up no more than 30 percent of the space within the motor perimeter 400.

The assembly and operation of the motor 220 of FIG. 9 into the motion control system 10 of FIGS. 1 and 2 is substantially the same as that for the motor 25 of FIG. 3.

The arrangements of the motors 25, 220 and other motors embodying the invention are compact and efficient in the use of space while still remaining stiff in the desired direction and flexible in other directions. In constructions of piezoelectric motors as illustrated herein, the dimensions of the motor are often related to or compared to the size of the piezoelectric stack. With regard to stiffness, it is generally desirable that the motor be very stiff in the direction of motion when compared to the stiffness in the direction of the preload. The following table illustrates the desired value for the various ratios as well as the actual ratios achieved for a piezoelectric motor that includes a piezoelectric stack that is 3 mm by 3 mm. With reference to FIG. 3, the width of the motor is its depth into the paper, the height of the motor is the largest dimension of the rotor in the "Y" direction of FIG. 3 and the length of the motor is the largest dimension of the rotor in the "X" direction of FIG. 3. In addition, the direction of motion is the "X" direction with the preload direction being in the "Y" direction.

| Ratio | Desired Value | Actual Value |
| --- | --- | --- |
| Stack Width/Motor Width | 1 to 1 | 1 to 1 |
| Stack Height/Motor Height | Less than 2 to 1 | 1.2 to 1 |
| Stack Length/Motor Length | Less than 6 to 1 | 4 to 1 |
| Stiffness in Direction of Motion/ Stiffness in Direction of preload (with design preload) | Greater than 80 to 1 | 120 to 1 |
| Stiffness in Direction of Motion/ Stiffness in Direction of preload (with no preload) | Greater than 100 to 1 | 150 to 1 |

Various features and advantages of the invention are set forth in the following claims.

What is claimed is:
1. A motion control system comprising:
a base;
a stage supported by the base and movable with respect to the base;
a motor coupled to the base and operable to move the stage, the motor including:
a mounting base arranged to connect the motor to the base;
a friction pad engageable with the stage;
a coupling portion including a first end connected to the mounting base and a second end, the friction pad connected to the coupling portion between the first end and the second end; and
a piezoelectric element disposed between the mounting base and the second end and operable in response to an electrical signal to move the friction pad and the stage; and a preload member including a motor end and an adjustment end, the motor end in contact with the motor and movable to apply a variable preload force to the motor, the adjustment end positioned to be accessible from an exterior of the base and substantially flush with the base.

2. The motion control system of claim 1, wherein preload force is adjustable between zero and 40 N.

3. The motion control system of claim 1, wherein the motor defines a motor perimeter, and wherein at least about 70 percent of the space within the perimeter is filled by the motor and the piezoelectric element.

4. The motion control system of claim 1, wherein the coupling portion includes a coupling pad at the second end and a rigid coupler extending between the coupling pad and the friction pad.

5. The motion control system of claim 4, wherein the coupling portion includes a tapered spring having a first end having a first width, a second end having a second width, and a turn portion having a turn width, wherein the first width and the second width are smaller than the turn width.

6. The motion control system of claim 5, wherein the coupling portion generally follows a circuitous path that extends from the coupling pad along the rigid coupler generally in a first direction, from the first end of the tapered spring to the turn portion in a second direction generally opposite the first direction, from the turn portion to the second end of the tapered spring in generally the first direction, and from the second end of the tapered spring to the first end of the coupling portion in generally the second direction.

7. A piezoelectric motor for use in a motion control system, the piezoelectric motor supported in a base and operable to move a stage, the piezoelectric motor comprising:
 a mounting base arranged to connect the piezoelectric motor to the base;
 a friction pad engageable with the stage;
 a piezoelectric element coupled to the mounting base and operable in response to an electrical signal to move the friction pad; and
 a coupling portion including a first end connected to the mounting base and a second end coupled to the piezoelectric element, the friction pad connected to the coupling portion between the first end and the second end, the coupling portion including a tapered spring having a first end having a first width, a second end having a second width, and a turn portion having a turn width, wherein the first width and the second width are smaller than the turn width.

8. The piezoelectric motor of claim 7, further comprising a preload member including a motor end and an adjustment end, the motor end in contact with the motor and movable to apply a variable preload force to the motor, the adjustment end positioned to be accessible from the exterior of the base.

9. The piezoelectric motor of claim 7, wherein the coupling portion includes a coupling pad at the second end and a rigid coupler extending between the coupling pad and the friction pad.

10. The piezoelectric motor of claim 9, wherein the coupling portion generally follows a circuitous path that extends from the coupling pad along the rigid coupler generally in a first direction, from the first end of the tapered spring to the turn portion in a second direction generally opposite the first direction, from the turn portion to the second end of the tapered spring in generally the first direction, and from the second end of the tapered spring to the first end of the coupling portion in generally the second direction.

* * * * *